Feb. 28, 1956      E. M. GRIFFITHS      2,736,670

METHOD OF SURFACE TREATING AND EXTRUDING DIE WITH CHROMIUM

Filed Sept. 17, 1954

INVENTOR.

Edward M. Griffiths

BY Nathaniel Frucht

Atty 2,736,670

METHOD OF SURFACE TREATING AND EXTRUDING DIE WITH CHROMIUM

Edward M. Griffiths, Taunton, Mass., assignor to National Glass Company, Inc., a corporation of Massachusetts Application September 17, 1954, Serial No. 456,817

2 Claims. (Cl. 117—65)

The present invention relates to the metal extrusion art, and has particular reference to a novel construction for an extrusion die.

The extrusion of metals into extruded shapes such as are used for door and window frames includes a container for metal heated to the plastic stage, an extrusion die having an extrusion orifice of the cross-sectional area and contour of the desired product, and a ram, usually operated by hydraulic pressure, which forces the plastic metal through the die orifice.

The standard material for the extrusion die, which is usually in the form of a disk, is hot worked steel. A steel extrusion die has certain disadvantages, however, when used for extruding a shape having large length to width ratios in excess of 4 to 1, in that there is failure due to excessive wear; further, the extrusion of metals such as aluminum creates additional problems, including the presence of die lines on the finished product and the corrosive and electrolytic action of the hot aluminum on the die surface.

The principal object of the invention is to provide an extrusion die having a surface which has a very long effective life, and particularly when used to extrude metal having large length to width ratios up to and exceeding a 10 to 1 ratio.

Another object of the invention is to provide an extrusion die which gives the extruded article a fine gloss finish, without die lines.

A further object of the invention is to provide an extrusion die which is not corroded or subjected to electrolytic action by the extrusion of hot aluminum.

With the above and other objects and advantageous features in view, the invention consists of a novel method and a novel extrusion die, more fully disclosed in the detailed description following, in conjunction with the accompanying drawings, and more specifically defined in the claims appended thereto.

Figure 1:
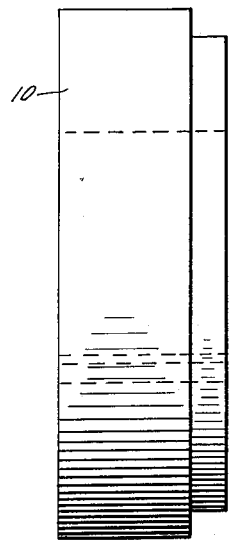
Fig. 1 is a side elevation of an illustrative extrusion die.
Figure 2:
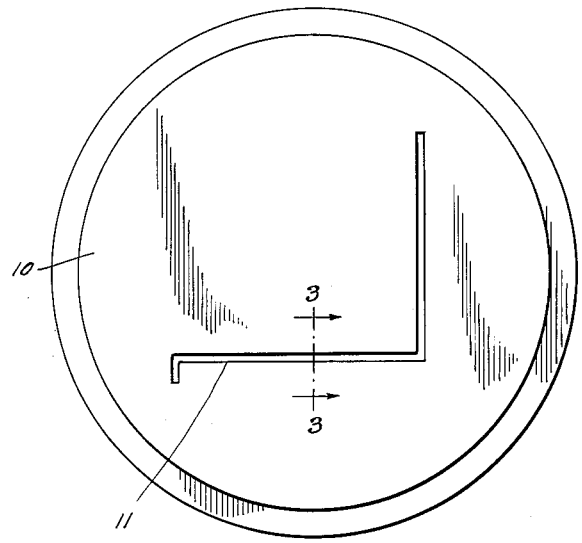
Fig. 2 is a plan view thereof.

Referring to the drawings, the illustrative extrusion die 10 is of standard disk form for mounting at the outlet end of an extrusion cylinder, and is provided with an extrusion orifice 11 having the cross section and the contour of the desired extruded article.

The most common die material used for the extrusion of aluminum strips is hot worked steel hardened to 46 to 52 Rockwell C, for use with aluminum heated to approximately 1000° F. and extruded within a pressure range of from 60,000 to 140,000 lbs. per sq. in., which pressure is reduced to a pressure at the die face of from 40,000 to 75,000 p. s. i. by friction between the plastic aluminum and the extrusion cylinder walls and internal friction within the extruded metal.

The die material heretofore used, which preferably has a hardness of about 55 Rockwell C at extrusion temperatures, is subject to corrosion and to local electrolytic action when hot aluminum is extruded. The effective die life is thus greatly reduced by wear, as the orifice dimensions cannot be restored; further, the steel die produces die marks which must subsequently be buffed out to provide a gloss finish.

Figure 3:
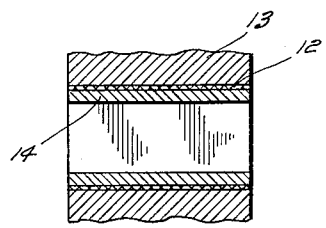
Fig. 3 is a greatly enlarged section on the line 3—3 of Fig. 2.

I have found that wear of the die is greatly reduced, and that better extrusion and a gloss finish results, when the die is surface processed to provide a stabilized austenitic surface. To this end, I first coat the die which is preferably hot worked steel of approximately 55 Rockwell C hardness, and particularly the extrusion orifice thereof, with chromium by plating or dipping, plating being preferred to provide a predetermined layer thickness. I then heat treat the coated die to a temperature sufficient to provide an austenitic chrome steel layer resulting from penetration of the steel by the chromium, by bringing the die slowly to a temperature of from 2600° F. to 2900° F., and preferably at 2800° F., in a period of approximately six hours. The heat treated die is now slowly air cooled for approximately six hours, to stabilize the austenitic layer 12 formed between the die material 13 and the outer chromium surface layer 14, see Fig. 3.

The resulting die has a Rockwell C hardness of approximately 35, and includes a steel base and a very tough austenitic layer which is extremely resistant to wear, which has a non-abrasive, non-corrosive surface layer that is highly resistant to electrolytic action and to surface pulling, whereby a high gloss finish is imparted to the extruded product.

The above-described method of manufacture thus provides a non-abrasive long wearing extrusion die, which can be brought back to size by replating or recoating, and by heat-treating again, if found necessary, and which has been found very desirable for the extrusion of aluminum architectural parts such as door and window frames.

Chromium is the preferred coating material, but other materials of the same chemical group having similar surface processing characteristics for a steel base may be used.

The austenitic layer of chrome steel described above may be heat treated to obtain a fine grain, by reheating to the critical temperature for the steel, this temperature being about 1600° F. for the steel described, and cooling. This procedure is not necessary for extrusion use, but may be desirable to provide longer life.

A similar treatment may be utilized for chrome coating a stamping die; the plate heat treated die is then preferably hardened; the heat treatment provides a non-abrasive surface layer on the die.

Although I have disclosed a specific surface processing for an extrusion die, it is obvious that the processing may be modified to meet different die requirements, without departing from the spirit or the scope of the invention as defined in the appended claims.

I claim:

1. In a method of surface treating an extruding die formed of steel of approximately 50 Rockwell C hardness comprising the steps of coating said die with a layer of chromium of predetermined thickness, heating said coated die at approximately 2800° F. for a period of approximately six hours to form an austenitic chrome steel layer resulting from penetration of the steel by the chromium, air cooling said heated die for approximately six hours to stabilize the austenitic layer formed on the surface of said die, reheating said die at approximately 1600° F. to obtain a fine grain of austenetic layer on the surface of said die, and cooling said die to form a surface resistant to corrosion and electrolytic action during an extruding operation.

2. In a method of surface treating a steel die comprising the steps of coating said die with a layer of chromium of predetermined thickness, heating said coated die at approximately 2800° F. for a period of approximately six hours to form an austenitic chrome steel layer resulting from penetration of the steel by the chromium and cooling said heated die for approximately six hours to stabilize the austenetic layer formed on the surface of said die.

References Cited in the file of this patent

UNITED STATES PATENTS

| | | |
|---|---|---|
| 1,708,715 | Akin | Apr. 9, 1929 |
| 1,718,563 | Kelley | June 25, 1929 |
| 1,817,680 | Pratt | Aug. 4, 1931 |
| 1,842,037 | Mason | Jan. 19, 1932 |
| 2,032,694 | Gertler | Mar. 3, 1936 |
| 2,141,640 | Cooper | Dec. 27, 1938 |
| 2,156,262 | Fink et al. | May 2, 1939 |
| 2,423,857 | Talmadge | July 15, 1947 |
| 2,490,543 | Robertson et al. | Dec. 6, 1949 |
| 2,638,213 | Clark | May 12, 1953 |
| 2,651,411 | Bennett | Sept. 8, 1953 |